(12) United States Patent
Nagata (10) Patent No.: US 10,946,754 B2
(45) Date of Patent: Mar. 16, 2021

(54) WIRELESS POWER TRANSMISSION DEVICE

(71) Applicant: Toyota Jidosha Kabushiki Kaisha, Toyota (JP)

(72) Inventor: Hideo Nagata, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/580,502

(22) Filed: Sep. 24, 2019

(65) Prior Publication Data

US 2020/0094697 A1 Mar. 26, 2020

(30) Foreign Application Priority Data

Sep. 26, 2018 (JP) .............................. JP2018-180500

(51) Int. Cl.
| | |
|---|---|
| H01F 27/42 | (2006.01) |
| H01F 37/00 | (2006.01) |
| H01F 38/00 | (2006.01) |
| B60L 53/124 | (2019.01) |
| H02J 7/02 | (2016.01) |
| H02J 50/12 | (2016.01) |
| B60L 53/37 | (2019.01) |
| H02J 5/00 | (2016.01) |
| B60L 53/38 | (2019.01) |
| H02J 50/80 | (2016.01) |

(52) U.S. Cl.
CPC .............. *B60L 53/124* (2019.02); *B60L 53/37* (2019.02); *B60L 53/38* (2019.02); *H02J 5/005* (2013.01); *H02J 7/025* (2013.01); *H02J 50/12* (2016.02); *H02J 50/80* (2016.02)

(58) Field of Classification Search
CPC ........ B60L 53/124; B60L 53/37; B60L 53/38; H02J 7/025; H02J 50/12; H02J 53/37; H02J 5/005; H02J 50/80; H02J 50/60
See application file for complete search history.

(56) References Cited

U.S. PATENT DOCUMENTS

| | | | |
|---|---|---|---|
| 2013/0069441 A1 | 3/2013 | Verghese et al. | |
| 2015/0323694 A1* | 11/2015 | Roy | B60L 53/124 307/104 |
| 2015/0331135 A1 | 11/2015 | Widmer | |
| 2016/0238731 A1* | 8/2016 | Chopra | H02J 5/005 |
| 2018/0152057 A1* | 5/2018 | Misawa | H04N 7/183 |
| 2019/0103771 A1* | 4/2019 | Piasecki | H04B 5/0037 |
| 2019/0109498 A1* | 4/2019 | Stingu | H02J 50/60 |
| 2020/0031244 A1* | 1/2020 | Tanaka | H02J 50/10 |

* cited by examiner

*Primary Examiner* — Rexford N Barnie
*Assistant Examiner* — Rasem Mourad
(74) *Attorney, Agent, or Firm* — Dinsmore & Shohl LLP (57) ABSTRACT

The power transmission device includes a power transmission coil configured to transmit power in a wireless manner to a power reception coil of a power reception device, a plurality of foreign object detection coils disposed along an upper surface of the power transmission coil, and a power supply ECU.

3 Claims, 10 Drawing Sheets

| SYSTEM STATUS | FOREIGN OBJECT DETECTION | |
| --- | --- | --- |
| | COIL | CAMERA |
| IDLE | OFF | OFF |
| WIRELESS CONNECTION ALIGNMENT (FINE POSITIONING) | ABSOLUTE DETECTION | OFF |
| VEHICLE PARKED (ALIGNMENT CHECK) | ↓ | FOREIGN OBJECT SENSOR ON |
| POWER TRANSMISSION | RELATIVE DETECTION | ↓ |
| POWER TRANSMISSION COMPLETED | OFF | OFF |

FIG.10

WIRELESS POWER TRANSMISSION DEVICE

CROSS REFERENCE TO RELATED APPLICATIONS

This nonprovisional application claims priority to Japanese Patent Application No. 2018-180500 filed on Sep. 26, 2018 with the Japan Patent Office, the entire contents of which are hereby incorporated by reference.

BACKGROUND

Field

The present disclosure relates to a wireless power transmission device including a power transmission coil and a foreign object detection coil configured to detect a foreign object around the power transmission coil.

Description of the Background Art

US Patent Application Publication No. 2013/0069441 discloses a wireless power transmission device which includes a power transmission coil configured to transmit power in a wireless manner to a power reception coil of a power reception device, and a foreign object detection configured to detect a foreign object around the power transmission coil. The power transmission device adopts such a method (a relative detection method) as the foreign object detection method to determine that a foreign object is present when at least one of the amplitude and phase of an output waveform of the foreign object detection coil has changed from the previous value.

SUMMARY

According to the foreign object detection method (relative detection method) disclosed in US Patent Application Publication No. 2013/0069441, it is assumed that no foreign object is present at the startup of the power transmission device, and the presence or absence of a foreign object is determined based on whether or not an output of the foreign object detection coil has changed from the previous value (when no foreign object is present).

However, in fact, a foreign object may be present at the startup of the power transmission device. Thus, the foreign object detection coil continues to output the same value as that when the foreign object is present at the startup. As a result, the output of the foreign object detection coil does not change from the previous value (when a foreign object is present), which makes it impossible to detect the foreign object.

The present disclosure has been made to solve the problems mentioned above, and an object of the present disclosure is to provide a wireless power transmission device which is provided with a plurality of foreign object detection coils and capable of accurately determining the presence or absence of a foreign object even when the foreign object is present at the startup.

(1) A wireless power transmission device according to the present disclosure includes: a power transmission coil configured to transmit power in a wireless manner to a power reception coil of a power reception device; a plurality of foreign object detection coils disposed along an upper surface of the power transmission coil; and a controller connected to the plurality of foreign object detection coils and configured to detect whether or not a foreign object is present above the power transmission coil by using outputs of the plurality of foreign object detection coils. The controller is configured to perform a first foreign object detection to determine that the foreign object is present above the power transmission coil when there is a difference between outputs of a group of foreign object detection coils each having the same wiring length to the controller among the plurality of foreign object detection coils.

The output of a foreign object detection coil depends on the wiring length between the foreign object detection coil and the controller. Therefore, in the group of foreign object detection coils having the same wiring length among the plurality of foreign object detection coils, when no foreign object is present above any of the foreign object detection coils, there is no difference between the outputs of the foreign object detection coils. However, if a foreign object is present above at least one foreign object detection coil, there is a difference between the output of at least one foreign object detection coil and the outputs of the rest foreign object detection coils without any foreign object present above.

Thus, the controller according to the present disclosure performs the first foreign object detection to determine that the foreign object is present when there is a difference between the outputs of a group of foreign object detection coils each having the same wiring length among the plurality of foreign object detection coils. According to the first foreign object detection, it is possible to accurately determine the presence or absence of a foreign object without comparing the output of the foreign object detection coil with the previous value thereof. As a result, it is possible to accurately determine the presence or absence of a foreign object even when the foreign object is present at the startup.

(2) In one aspect, in the first foreign object detection, the controller is configured to compare an average value of outputs of the group of foreign object detection coils each having the same wiring length with an output of each foreign object detection coil, and determine that the foreign object is present above a foreign object detection coil when the difference between the average value and the output of the foreign object detection coil is greater than a predefined value.

According to the above aspect, it is possible to determine that the foreign object is present above any of the group of foreign object detection coils having the same wiring length.

(3) In one aspect, the controller is configured to perform the first foreign object detection before the start of the power transmission from the power transmission coil to the power reception coil, and perform a second foreign object detection, instead of the first foreign object detection, to determine that the foreign object is present above at least one foreign object detection coil of the plurality of foreign object detection coils when an output of the at least one foreign object detection coil changes during the power transmission from the power transmission coil to the power reception coil.

In addition to the wiring length, the output of a foreign object detection coil also depends on the temperature thereof. Before the start of the power transmission by the power transmission coil, it is assumed that the temperature of each of the foreign object detection coils is approximately the same as the outside temperature and there is no difference between the temperatures of the plurality of foreign object detection coils. However, during the power transmission by the power transmission coil, a temperature difference may occur between the plurality of foreign object detection coils due to the difference in magnetic flux density around the power transmission coil. Therefore, during the power transmission, even if no foreign object is present above any of the plurality of foreign object detection coils having the same wiring length, the temperature difference between the plurality of foreign object detection coils may cause a difference between the outputs of the plurality of foreign object detection coils, which may reduce the detection accuracy of the first foreign object detection.

Thus, the controller according to the above aspect performs the first foreign object detection before the start of the power transmission by the power transmission coil, and performs a second foreign object detection instead of the first foreign object detection during the power transmission from the power transmission coil to the power reception coil to determine that the foreign object is present above at least one foreign object detection coil of the plurality of foreign object detection coils when an output of the at least one foreign object detection coil changes.

(4) In one aspect, the wireless power transmission device further includes a camera disposed on the upper surface of the power transmission coil. The controller is configured to detect, by using the camera, a foreign object that is present in a range away from the upper surface of the power transmission coil with a predefined distance or more in an upward direction.

According to the above aspect, it is possible to use the camera to detect a foreign object that is present in a range away from the upper surface of the power transmission coil with a predefined distance or more in the upward direction.

The foregoing and other objects, features, aspects and advantages of the present disclosure will become more apparent from the following detailed description of the present disclosure when taken in conjunction with the accompanying drawings.

DETAILED DESCRIPTION

Hereinafter, an embodiment of the present disclosure will be described in detail with reference to the drawings. In the drawings, the same or corresponding portions are denoted by the same reference numerals, and the description thereof will not be repeated.

In the following description, arrows F, B, R, L, U and D in the drawings represent directions relative to a vehicle. Specifically, arrow F represents the forward direction, arrow B represents the backward direction, arrow R represents the right direction, arrow L represents the left direction, arrow U represents the upward direction, and arrow D represents the downward direction. In the following description, an electronic control unit is abbreviated as "ECU". The specific numerical values to be described in the following description are merely examples and may be modified appropriately.

<Configuration of Power Transfer System>

Figure 1:
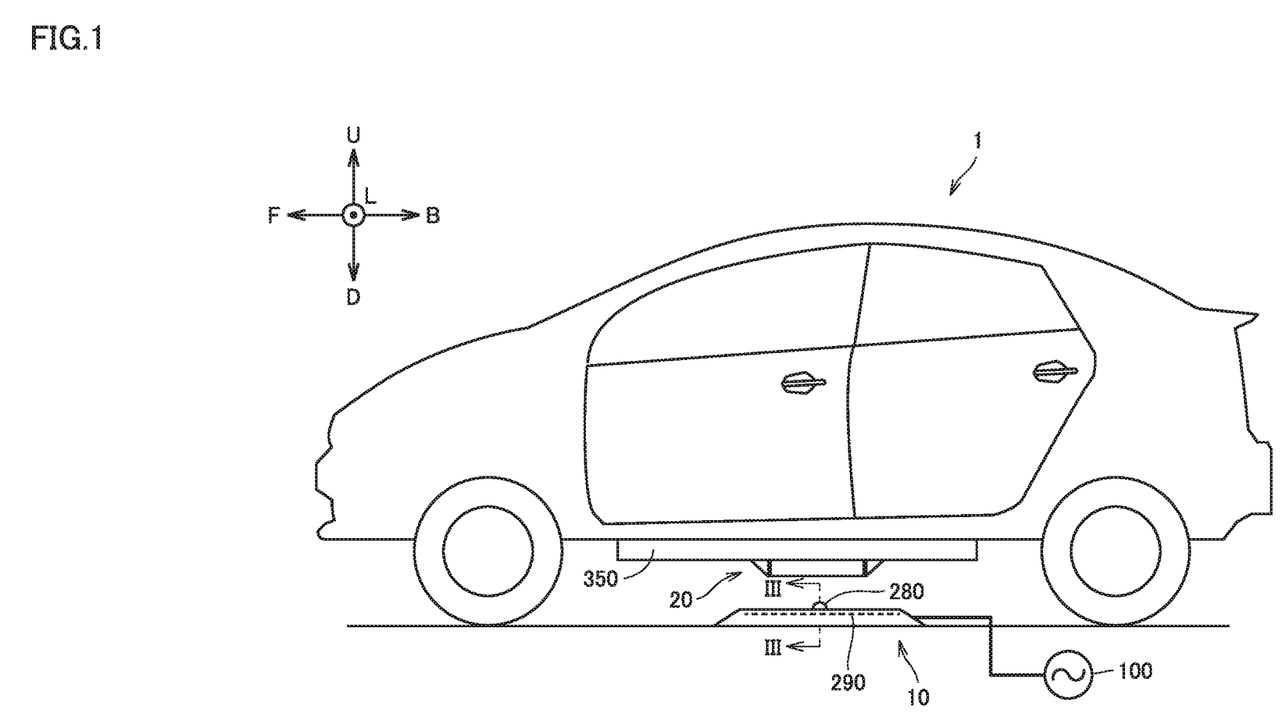
FIG. 1 is an external view of a power transfer system including a power transmission device.

FIG. 1 is an external view of a power transfer system including a power transmission device 10 according to the present embodiment. The power transfer system includes a vehicle 1 and a power transmission device 10. The vehicle 1 is equipped with a power reception device 20. The power reception device 20 is disposed on the bottom surface of the vehicle 1, for example, on a lower surface (facing the road) of a power storage device 350 installed on the bottom surface of the vehicle 1. The vehicle 1 is configured to travel by using the power supplied from the power transmission device 10 and stored in the power storage device 350.

The power transmission device 10 receives power from an AC power supply (for example, a commercial power supply) 100. The power transmission device 10 is installed on the ground. The power transmission device 10 is configured to transmit power in a wireless manner to the power reception device 20 through a magnetic field when the vehicle 1 is aligned such that the power reception device 20 of the vehicle 1 faces the power transmission device 10.

The power transmission device 10 includes a camera 280. The camera 280 is equipped with a fisheye lens and is disposed substantially at the center of the upper surface of the power transmission device 10. Since the camera 280 is equipped with a fisheye lens, it is possible for it to photograph a wide space including the power reception device 20 when the vehicle 1 is being moved toward the power transmission device 10. An image photographed by the camera 280 is used as information indicating the relative position of the power reception device 20 of the vehicle 1 to the power transmission device 10 when the vehicle 1 is being aligned relative to the power transmission device 10.

The power transmission device 10 further includes a foreign object detection device 290. The foreign object detection device 290 is configured to magnetically detect a metal foreign object (such as a beverage can or a coin) when such foreign object is present on the upper surface of the power transmission device 10.

As to be described later, an image photographed by the camera 280 may also be used as information for detecting whether or not a foreign object is present above the power transmission device 10. The foreign object that may be detected by the camera 280 is not limited to a metal object, it may be an animal, for example.

Figure 2:
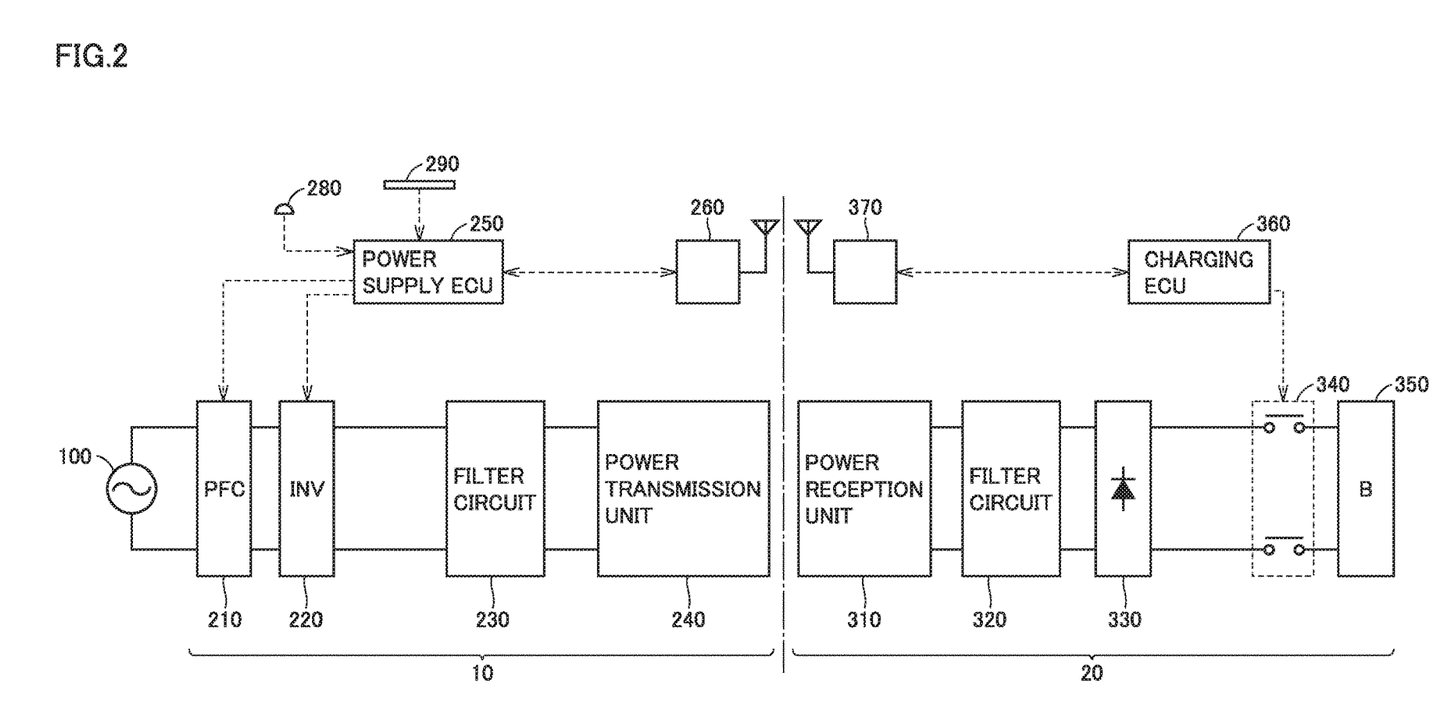
FIG. 2 is a diagram illustrating an overall configuration of a power transmission device and a power reception device.

FIG. 2 is a diagram illustrating an overall configuration of the power transmission device 10 and the power reception device 20. The power transmission device 10 includes a PFC (Power Factor Correction) circuit 210, an inverter 220, a filter circuit 230, a power transmission unit 240, a power supply ECU (Electronic Control Unit) 250, a communication unit 260, the camera 280 and the foreign object detection device 290 mentioned above. The power reception device 20 includes a power reception unit 310, a filter circuit 320, a rectification unit 330, a relay circuit 340, a power storage device 350, a charging ECU 360, and a communication unit 370.

According to the power transfer system, in the power transmission device 10, the power received from the AC power supply 100 such as a commercial power supply is rectified and boosted in the PFC circuit 210 and then supplied to the inverter 220. The inverter 220 converts the power rectified by the PFC circuit 210 into AC power and supplies it to the power transmission unit 240 through the filter circuit 230. Each of the power transmission unit 240 and the power reception unit 310 includes a resonance circuit and is configured to resonate at the frequency of the transmission power.

When the AC power is supplied from the inverter 220 through the filter circuit 230 to the power transmission unit 240, a magnetic field is formed between a power transmission coil 242 (see FIG. 3) of the power transmission unit 240 and a power reception coil (not shown) of the power reception unit 310, and thereby, the energy (or power) is transferred from the power transmission unit 240 to the power reception unit 310 through the magnetic field. The energy (or power) transferred to the power reception unit 310 is supplied to the power storage device 350 through the filter circuit 320 and the rectification unit 330. Thus, the power storage device 350 is charged.

The power storage device 350 is a rechargeable DC power supply, and includes a secondary battery such as a lithium-ion battery or a nickel-metal hydride battery. The relay circuit 340 is provided between the rectification unit 330 and the power storage device 350. The relay circuit 340 is turned on (or brought into conduction) when the power storage device 350 is to be charged by the power transmission device 10.

The power supply ECU 250 includes a CPU (Central Processing Unit), a memory, an input/output port for inputting/outputting various signals and the like (none of which is shown), and is configured to receive signals front each sensor and execute a control on various units provided in the power transmission device 10. For example, when the power is to be transmitted from the power transmission device 10 to the power reception device 20, the power supply ECU 250 performs a switching control on the PFC circuit 210 and the inverter 220. Note that the control is not necessarily processed by software, it may be processed by dedicated hardware (such as an electronic circuit).

The communication unit 260 is configured to wirelessly communicate with the communication unit 370 of the power reception device 20. The communication unit 260 outputs a foreign object detection signal to the power reception device 20 when, for example, a foreign object is detected by the camera 280 or the foreign object detection device 290, or receives from the power reception device 20 information indicating the amount of power received by the vehicle 1.

The charging ECU 360 includes a CPU, a memory, an input/output port and the like (none of which is shown), and is configured to receive signals from each sensor and perform a control on various units provided in the power reception device 20. Note that the control is not necessarily processed by software, it may be processed by dedicated hardware (such as an electronic circuit).

The communication unit 370 receives, for example, a foreign object detection signal from the power transmission device 10, or transmits information indicating the amount of power received by the vehicle 1 to the power transmission device 10.

Figure 3:
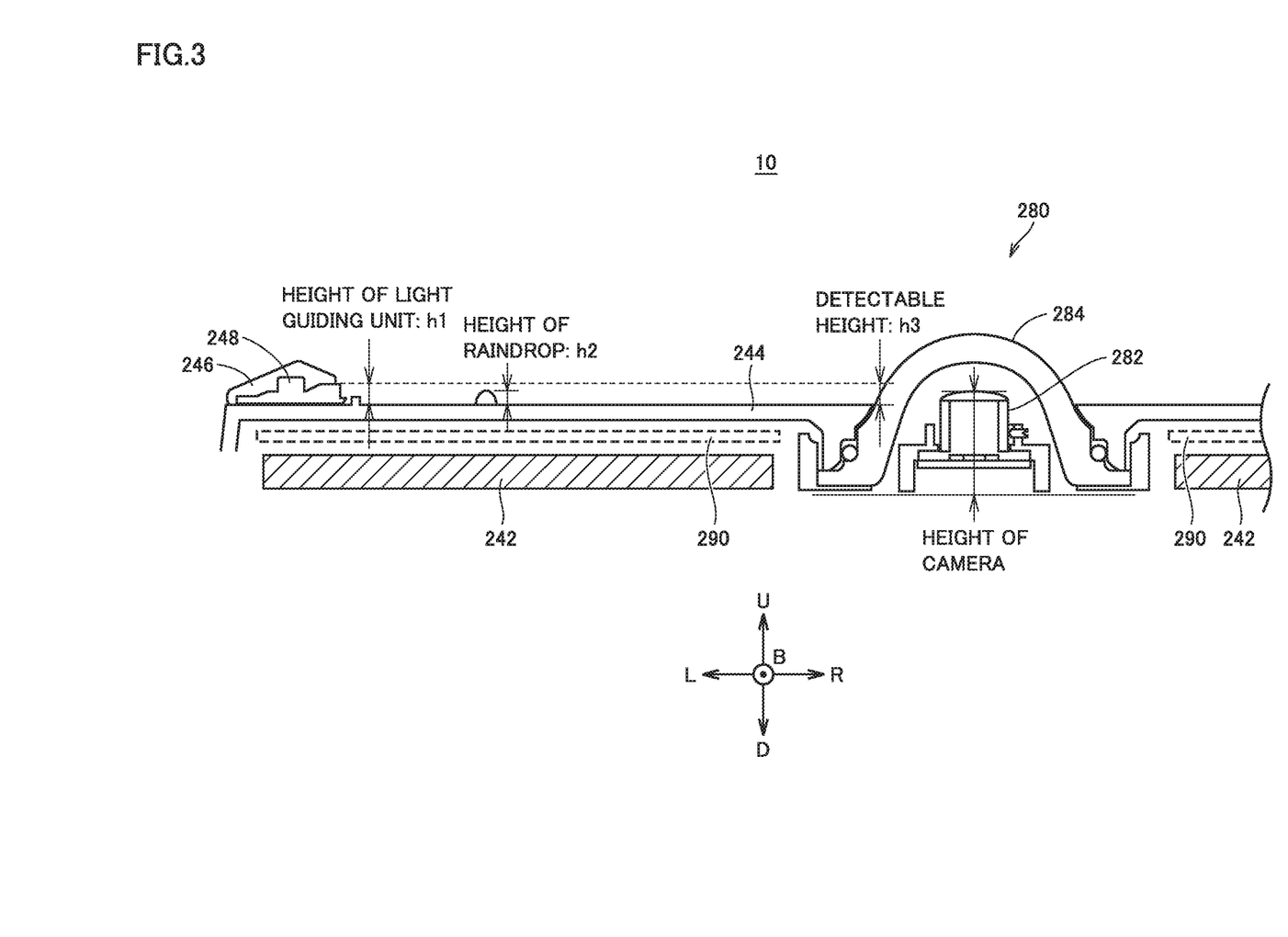
FIG. 3 is a cross-sectional view of the power transmission device.

FIG. 3 is a cross-sectional view of the power transmission device 10 taken along a line III-III in FIG. 1. The power transmission device 10 is covered by a cover 244 made of resin. The power transmission coil 242 of the power transmission unit 240 is annularly formed around the camera 280 along the lower surface of the cover 244. The power is transmitted in a wireless manner from the power transmission coil 242 to the power reception device 20 through a magnetic field.

The foreign object detection device 290 is disposed between the power transmission coil 242 and the cover 244. The foreign object detection device 290 includes a plurality of foreign object detection coils disposed along the upper surface of the power transmission coil 242. The foreign object detection device 290 is configured to magnetically detect a metal foreign object present on the upper surface of the cover 244 of the power transmission device 10. The detailed configuration of the foreign object detection device 290 will be described later (with reference to FIGS. 4 and 5).

A hole is provided at the center of the cover 244, and the camera 280 is disposed in the hole. The camera 280 includes a photographing member 282 and a transparent glass member 284 that covers the photographing member 282. The fisheye lens provided at the upper end of the photographing member 282 protrudes out of the cover 244. Thereby, the photographing member 282 may photograph a wide space including the upper surface of the power transmission device 10.

A light guiding unit 246 is annularly provided at the peripheral edge of the cover 244 along the outer periphery of the cover 244 and configured to guide light emitted from a light emitter 248 such as a light emitting diode (LED) toward the camera 280. The light emitter 248 is turned on during the foreign object detection by the camera 280.

The light guiding unit 246 is provided with an opening that faces the camera 280, and the height of light emitted from the light emitter 248 toward the camera 280 is determined by the height h1 of the opening of the light guiding unit 246. When a foreign object is present between the camera 280 and the light emitter 248, a part of the light emitted from the light emitter 248 will be blocked by the foreign object. Thereby, an image photographed by the camera 280 when a foreign object is present on the cover 244 of the power transmission device 10 would be different from the image photographed by the camera 280 when no foreign object is present. Thereby, the camera 280 may be used to detect a foreign object.

In the present embodiment, in order to prevent a raindrop on the upper surface of the cover 244 from being falsely detected as a foreign object, a detectable foreign object height h3 by the camera 280 is set higher than a possible height h2 of a raindrop. In other words, in the present embodiment, when a foreign object with a height equal to or greater than the detectable foreign object height h3 is present on the upper surface of the cover 244, it is determined that a foreign object is detected by the camera 280. Thereby, even when a raindrop is present on the upper surface of the cover 244, it is prevented from being falsely detected as a foreign object.

However, when a metal foreign object with a height less than the detectable foreign object height h3 is present on the upper surface of the cover 244, it may be detected by the foreign object detection device 290 mentioned above. In other words, in the present embodiment, although the foreign object detection device 290 that performs the foreign object detection by using the foreign object detection coil can not accurately detect the presence or absence of a foreign object with the height h3 or more from the upper surface of the cover 244, such foreign object may be detected by the camera 280.

Figure 4:
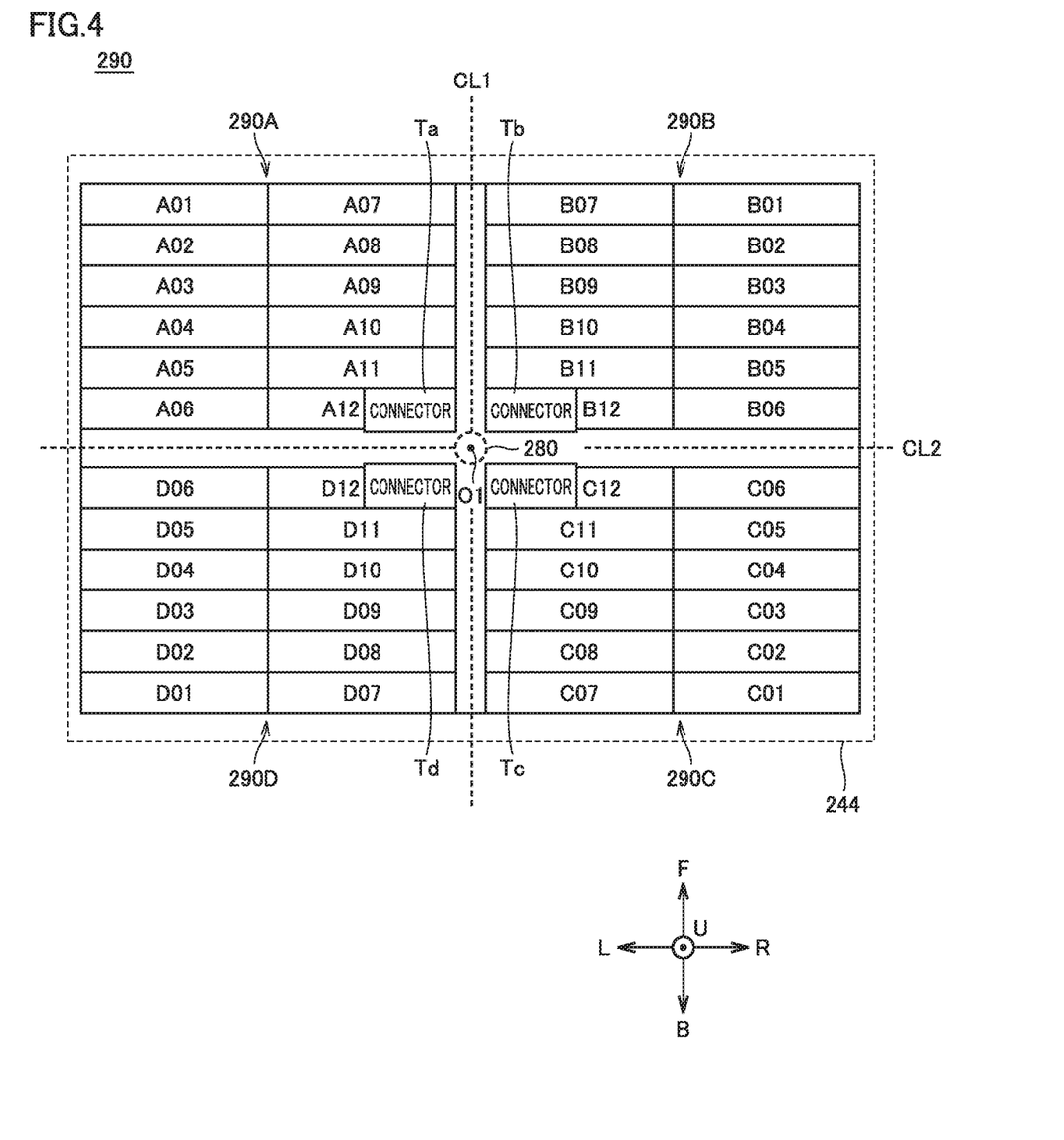
FIG. 4 is a diagram illustrating an example of the internal configuration of a foreign object detection device.

FIG. 4 is a diagram illustrating an example of the internal configuration of the foreign object detection device 290. In order to detect a foreign objects that may be present in a wide range of the upper surface of the cover 244, the foreign object detection device 290 is disposed across the entire lower surface of the cover 244 (the entire upper surface of the power transmission coil 242). The foreign object detection device 290 is divided into a plurality of (for example, 4) coil units 290A, 290B, 290C and 290D.

The coil unit 290A is disposed in a region on the front left side of the cover 244. The coil unit 290A includes a plurality of (for example, 12) foreign object detection coils A01 to A12 and a connector Ta. The connector Ta is disposed near the center of the cover 244, and is connected to the power supply ECU 250. The plurality of foreign object detection coils A01 to A12 are arranged in a 6×2 matrix in the region on the front left side of the cover 244.

Figure 5:
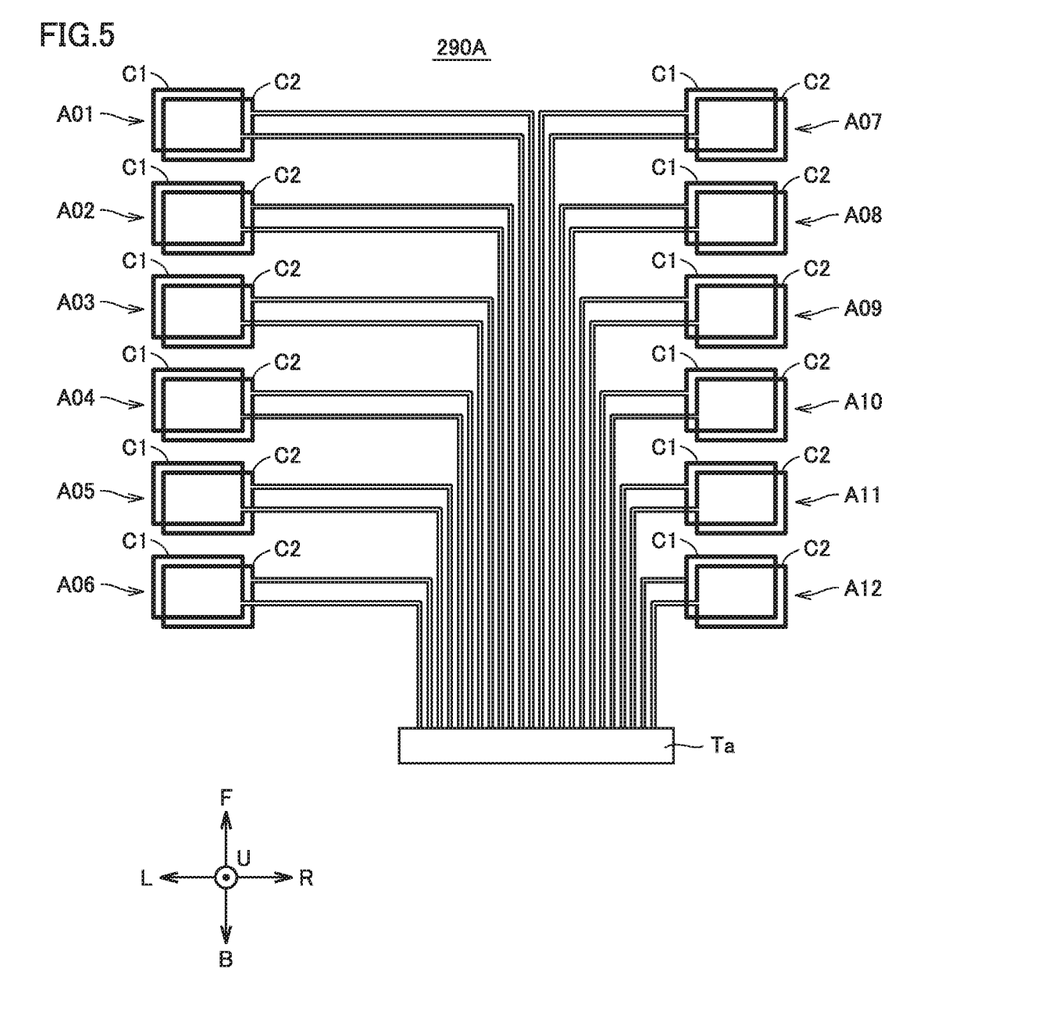
FIG. 5 is a diagram schematically illustrating an example of the detailed configuration of a coil unit.

FIG. 5 is a diagram schematically illustrating an example of the detailed configuration of the coil unit 290A. As described in the above, the coil unit 290A includes a plurality of foreign object detection coils A01 to A12 arranged in a 6×2 matrix and a connector Ta disposed near the center of the cover 244. The plurality of foreign object detection coils A01 to A12 are connected to the connector Ta by a plurality of wires with different lengths.

Each of the foreign object detection coils A01 to A12 includes a pair of transmission coil C1 and reception coil C2. The transmission coil C1 and the reception coil C2 have the same size and shape, and are arranged to face each other in the vertical direction of the vehicle.

When an AC voltage for detecting a foreign object is applied to the transmission coil C1, the transmission coil C1 generates a detection magnetic field, which induces an induction voltage in the reception coil C2 disposed to face the transmission coil C1. At this time, if a metal foreign object is present above the foreign object detection coil, the detection magnetic field is affected by the foreign object, which causes the coupling coefficient between the transmission coil C1 and the reception coil C2 to become different from the value when no foreign object is present, and thereby the detection voltage (induction voltage) of the reception coil C2 becomes different from the value when no foreign object is present. Thus, the foreign object may be detected based on the difference in the detection voltage of the reception coil C2.

Referring back to FIG. 4, the coil unit 290B is disposed in a region on the front right side of the cover 244. The coil unit 290B has the same configuration as the coil unit 290A. In other words, the coil unit 290B includes a plurality of foreign object detection coils B01 to B12 arranged in a 6×2 matrix, and a connector Tb disposed near the center of the cover 244. Each of the foreign object detection coils B01 to B12 includes a pair of transmission coil C1 and reception coil C2. The plurality of foreign object detection coils B01 to B12 are connected to the connector Tb by a plurality of wires with different lengths.

The plurality of foreign object detection coils B01 to B12 are arranged in line symmetry to the plurality of foreign object detection coils A01 to A12, respectively, with a center line CL1 of the cover 244 in the left-right direction of the vehicle as the symmetric axis. The wiring length from each of the plurality of foreign object detection coils B01 to B12 to the connector Tb is set equal to the wiring length from a corresponding one of the plurality of foreign object detection coils A01 to A12 to the connector Ta.

The coil unit 290C is disposed in a region on the rear right side of the cover 244. The coil unit 290C has the same configuration as the coil unit 290A. In other words, the coil unit 290C includes a plurality of foreign object detection coils C01 to C12 arranged in a 6×2 matrix, and a connector Tc disposed near the center of the cover 244. Each of the foreign object detection coils C01 to C12 includes a pair of transmission coil C1 and reception coil C2. The plurality of foreign object detection coils C01 to C12 are connected to the connector Tc by a plurality of wires with different lengths.

The plurality of foreign object detection coils C01 to C12 are arranged in point symmetry to the plurality of foreign object detection coils A01 to A12, respectively, with the center O1 of the cover 244 as the symmetric point. The wiring length from each of the plurality of foreign object detection coils C01 to C12 to the connector Tc is set equal to the wiring length from a corresponding one of the plurality of foreign object detection coils A01 to A12 to the connector Ta.

The coil unit 290D is disposed in a region on the rear left side of the cover 244. The coil unit 290D has the same configuration as the coil unit 290A. In other words, the coil unit 290D includes a plurality of foreign object detection coils D01 to D12 arranged in a 6×2 matrix, and a connector Td disposed near the center of the cover 244. Each of the foreign object detection coils D01 to D12 includes a pair of transmission coil C1 and reception coil C2. The plurality of foreign object detection coils D01 to D12 are connected to the connector Td by a plurality of wires with different lengths.

The plurality of foreign object detection coils D01 to D12 are arranged in line symmetry to the plurality of foreign object detection coils A01 to A12, respectively, with a center line CL2 of the cover 244 in the front-rear direction of the vehicle as the symmetric axis. The wiring length from each of the plurality of foreign object detection coils D01 to D12 to the connector Td is set equal to the wiring length from a corresponding one of the plurality of foreign object detection coils A01 to A12 to the connector Ta. Hereinafter, the length of a wire between each foreign object detection coil and the corresponding connector is simply referred to as "wiring length".

With the above configuration in the present embodiment, among the 48 foreign object detection coils A01 to D12, the 4 foreign object detection coils A01, B01, C01 and D01 have the same wiring length. Similarly, the 4 foreign object detection coils A02, B02, C02 and D02 have the same the wiring length. In the present embodiment, a total of 12 (1 to 12) groups of foreign object detection coils have the same wiring length.

Hereinafter, the group of foreign object detection coils having a wiring length equal to the wiring length of the i-th (i=1 to 12) foreign object detection coil of the foreign object detection coils A01 to A12 is referred to as "the i-th group". Each group includes 4 foreign object detection coils. For example, the 7th group with a group number i=7 includes 4 foreign object detection coils A07, B07, C07 and D07.

Figure 6:
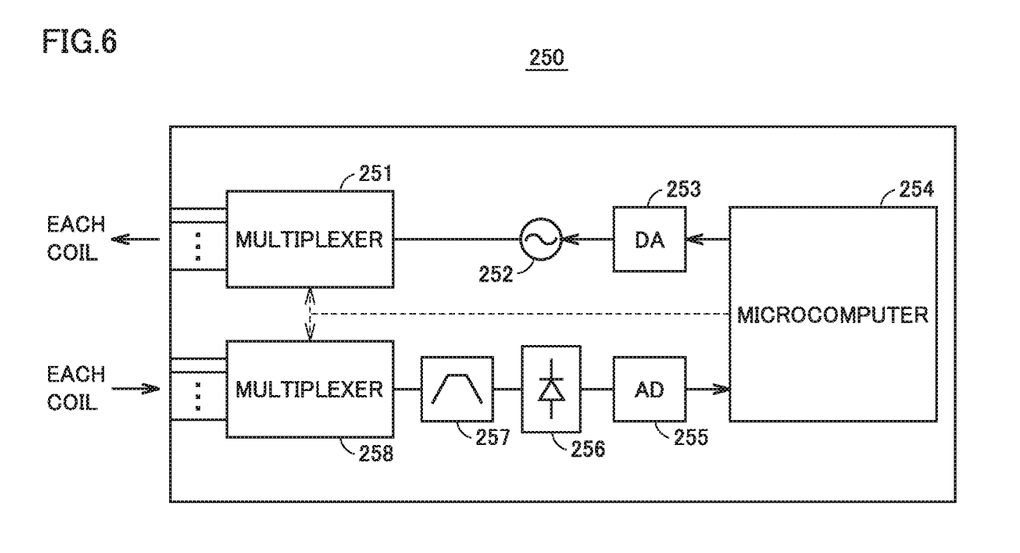
FIG. 6 is a diagram illustrating an example of a control circuit for detecting a foreign object by using an output of a foreign object detection coil.

FIG. 6 is a diagram illustrating an example of a control circuit for detecting a foreign object using the outputs of the foreign object detection coils A01 to D12. Although the control circuit illustrated in FIG. 6 is described below as being included in the power supply ECU 250, the control circuit illustrated in FIG. 6 may be provided as being separate from the power supply ECU 250.

The control circuit includes multiplexers 251 and 258, an oscillator 252, a D/A converter 253, a microcomputer 254, an A/D converter 255, a detector 256, and a band pass filter 257.

The multiplexer 251 is connected to the connectors Ta to Td of the foreign object detection device 290, and thus is sequentially connected to the transmission coil C1 of each of the plurality of foreign object detection coils A01 to D12 via the connectors Ta to Td.

The oscillator 252 generates a detection signal (AC voltage) of a predefined frequency (for example, several MHz) in response to an instruction of the microcomputer 254 input from the D/A converter 253, and outputs the detection signal to the multiplexer 251. The multiplexer 251 sequentially outputs the detection signal to the transmission coil C1 of each of the plurality of foreign object detection coils A01 to D12 in accordance with a switching instruction from the microcomputer 254.

When the detection signal is applied to the transmission coil C1, the transmission coil C1 generates a detection magnetic field. The detection magnetic field generated by the transmission coil C1 induces an induction voltage in the reception coil C2 disposed to face the transmission coil C1.

The multiplexer 258 is connected to the connectors Ta to Td of the foreign object detection device 290, and thus is sequentially connected to the reception coil C2 facing the transmission coil C1, to which the detection signal is applied from the multiplexer 251, of each of the plurality of foreign object detection coils A01 to D12 via the connectors Ta to Td.

The detection voltage input to the multiplexer 258 from the reception coil C2 is subjected to noise removal by the band pass filter 257 and rectification by the detector 256, and then input to the A/D converter 255. The A/D converter 255 converts the signal rectified by the detector 256 into a digital signal and outputs the digital signal to the microcomputer 254. The signal output from the A/D converter 255 to the microcomputer 254 indicates the amplitude of the voltage waveform output by the reception coil C2.

<Method of Detecting Foreign Object by Foreign Object Detection Coil>

Hereinafter, a method of detecting a foreign object by using the foreign object detection coils A01 to D12 (hereinafter simply referred to as "foreign object detection coils") will be described. In the present embodiment, two types of methods, i.e., a relative detection method and an absolute detection method (grouping method) are used as the method of detecting a foreign object by using the foreign object detection coil.

1. Relative Detection Method

The relative detection method is a method or determining the presence or absence of a foreign object based on whether or not the amplitude of an output voltage of a foreign object detection coil (more specifically, the detection voltage of the reception coil C2) has changed from the previous value. In other words, as described in the above, when an AC voltage for detecting a foreign object is applied to the transmission coil C1 of the foreign object detection coil, the transmission coil C1 generates a detection magnetic field, which induces an induction voltage in the reception coil C2 disposed to face the transmission coil C1. At this time, if a foreign object is present nearby the foreign object detection coil, due to the interlinkage of the magnetic field formed around the transmission coil C1 and the reception coil C2 to the foreign object, the amplitude of the detection voltage of the reception coil C2 becomes different from the amplitude when no foreign object is present. Based on this property, in the relative detection method, the microcomputer 254 monitors the amplitude of the detection voltage of the reception coil C2, and determines that a foreign object is present above the reception coil C2 when the amplitude of the detection voltage of the reception coil C2 has changed from the previous value (when no foreign object is present).

2. Absolute Detection Method (Grouping Method)

As described in the above, in the relative detection method, it is assumed that no foreign object is present on the upper surface of the power transmission device 10 at the startup of the power transmission device 10, and the presence or absence of a foreign object is determined based on whether or not the amplitude of the output voltage of the foreign object detection coil has changed from the previous value (when no foreign object is present).

In fact, a foreign object may be present on the upper surface of the power transmission device 10 at the startup of the power transmission device 10. In this case, the foreign object detection coil continues to output the same voltage as that when the foreign object is present at the startup of the power transmission device 10. As a result, the amplitude of the output voltage of the foreign object detection coil does not change from the previous value (when a foreign object is present), which makes it impossible to detect the foreign object.

The output of a foreign object detection coil will be different if the wiring length or the temperature thereof is different, and in particular, the matching constant of a foreign object detection coil will be different if the wiring length thereof is different. Here, the matching constant refers to the capacity (unit: pf) of the reception coil C2 at the time when the amplitude of the detection voltage of the reception coil C2 facing the transmission coil C1 becomes maximum as a detection signal of a predefined frequency (for example, several MHz) is input to the transmission coil C1.

If the wiring length of a foreign object detection coil is different, the matching constant of the foreign object detection coil will be different, and thus, the amplitude of the output voltage of the foreign object detection coil will be different even at the same temperature. In other words, when the wiring length of the foreign object detection coil is the same, the matching constant of the foreign object detection coil is the same, and when the other conditions (the temperature and the presence or absence of a foreign object) are the same, the amplitude of the output voltage of the foreign object detection coil will be the same. Therefore, for a group of foreign object detection coils having the same wiring length, when no foreign object is present above any of the foreign object detection coils, there is no difference between the outputs of the foreign object detection coils. However, when a foreign object is present above a foreign object detection coil, a difference would occur between the output of the foreign object detection coil and the output of the remaining coils without any foreign object above.

Thus, the present embodiment is configured to perform an "absolute detection method", i.e., to group the foreign object detection coils having the same wiring length, and determine that a foreign object is present when there is a difference between the outputs of the foreign object detection coils in the same group. According to the "absolute detection method", it is possible to accurately determine the presence or absence of a foreign object without comparing the output of the foreign object detection coil with the previous value thereof. As a result, it is possible to accurately determine the presence or absence of a foreign object even when the foreign object is present at the startup of the power transmission device 10.

<Switching of Foreign Object Detection Method>

When the foreign object detection is performed according to the absolute detection method described in the above, a temperature difference may occur between a plurality of foreign object detection coils due to the difference in magnetic flux density around the power transmission coil 242 during the wireless power transmission by the power transmission coil 242. Therefore, during the wireless power transmission, even if the foreign object detection coils have the same wiring length, the output difference may be caused not only by the presence or absence of a foreign object but also by the temperature difference, which may lower the detection accuracy of the absolute detection method.

Thus, the microcomputer 254 according to the present embodiment performs the foreign object detection according to the absolute detection method before the start of the wireless power transmission, and during the wireless power transmission, performs the foreign object detection according to the relative detection method instead of the absolute detection method. Thereby, it is possible to accurately determine the presence or absence of a foreign object before the start of the wireless power transmission and during the wireless power transmission.

Since the foreign object detection coil can not accurately detect a foreign object that is far away from each coil, in the present embodiment, the camera 280 is used to detect a foreign object that is far away from the foreign object detection coil.

Figure 7:
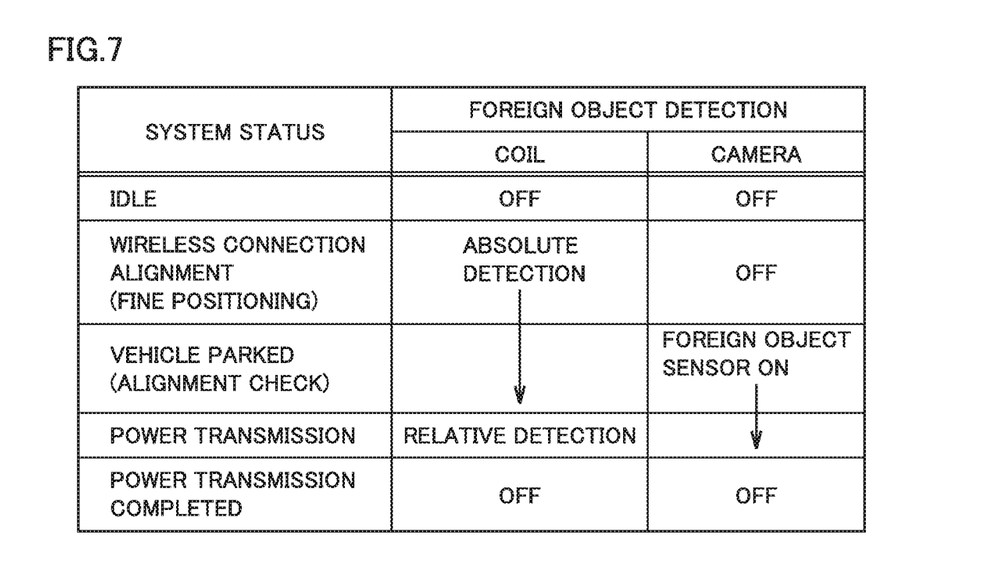
FIG. 7 is a diagram illustrating a switching sequence of foreign object detection methods.

FIG. 7 is a diagram illustrating a switching sequence of foreign object detection methods. When the power transmission device 10 is in the idle state (standby state), the foreign object detection by the foreign object detection coil (hereinafter also referred to as "coil foreign object detection") and the foreign object detection by the camera 280 (hereinafter also referred to as "camera foreign object detection") are both turned off (stopped).

When the wireless connection is established between the vehicle 1 and the power transmission device 10 and the alignment (fine positioning) between the vehicle 1 and the power transmission device 10 is started, the coil foreign object detection according to the absolute detection method is initiated. Thus, if a foreign object is present on the upper surface of the power transmission device 10 before the start of coil foreign object detection (at the startup of the power transmission device 10), it may be accurately detected.

After the vehicle 1 has been parked in such a manner that the alignment between the vehicle 1 and the power transmission device 10 is completed, in addition to the coil foreign object detection according to the absolute detection method, the camera foreign object detection is also started. As a result, not only the metal foreign object in a range close to the upper surface of the power transmission device 10 but also the foreign object in a range away from the upper surface of the power transmission device 10 may be detected.

After the wireless power transmission from the power transmission coil 242 is started, the coil foreign object detection is switched from the absolute detection method to the relative detection method. As a result, during the wireless power transmission, even if the temperatures between the foreign object detection coils having the same wiring length become different due to the wireless power transmission, which thereby causes a difference between the outputs of the foreign object detection coils, the foreign object detection by the foreign object detection coils may be performed accurately. The camera foreign object detection is also continued during the wireless power transmission.

When the wireless power transmission is completed, both the coil foreign object detection and the camera foreign object detection are turned off (stopped).

<Process Flow of Coil Foreign Object Detection>

Figure 8:
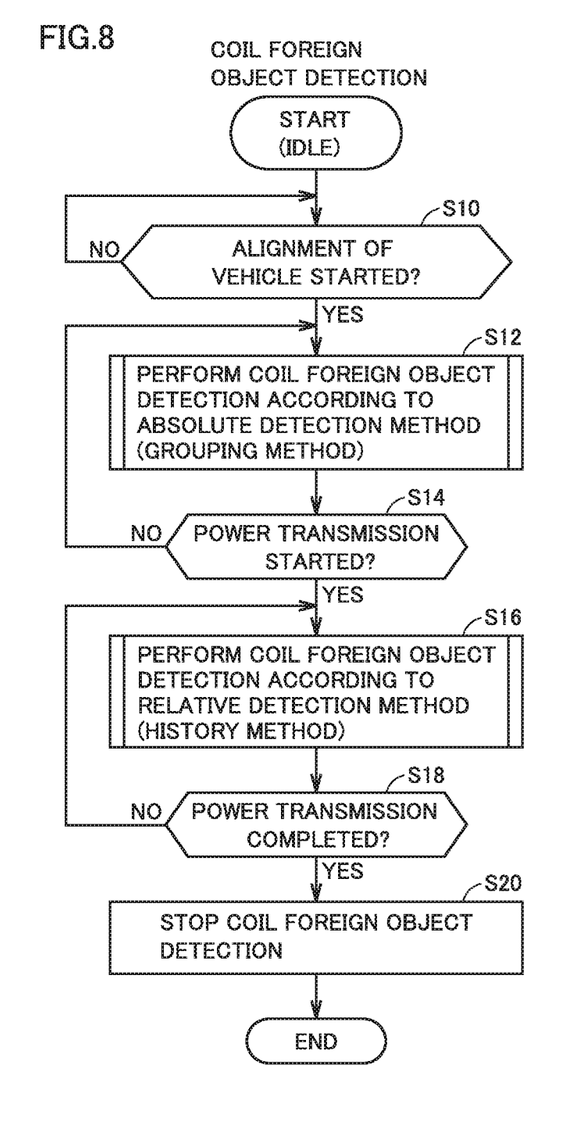
FIG. 8 is a flowchart schematically illustrating an example of a process to be performed by a power supply ECU when performing the coil foreign object detection.

FIG. 8 is a flowchart schematically illustrating an example of a process to be performed by the power supply ECU 250 (microcomputer 254) when performing the coil foreign object detection. This flowchart is started when the power transmission device 10 is in the idle state (standby state). As described in the above, the coil foreign object detection is stopped in the idle state.

The power supply ECU 250 determines whether or not the wireless connection with the vehicle 1 is established and the alignment of the vehicle 1 is started (step S10). If it is determined that the alignment of the vehicle 1 is not started (NO in step S10), the power supply ECU 250 returns the procedure to step S10 and waits for the start of the alignment.

If it is determined that the alignment of the vehicle 1 is started (YES in step S10), the power supply ECU 250 performs the coil foreign object detection according to the absolute detection method (step S12). The contents of the coil foreign object detection according to the absolute detection method will be described later in detail with reference to FIG. 9.

Next, the power supply ECU 250 determines whether or not the wireless power transmission to the vehicle 1 is started (step S14). If it is determined that the wireless power transmission to the vehicle 1 is not started (NO in step S14), the power supply ECU 250 returns the procedure to step S12, and continues to perform the coil foreign object detection accordion to the absolute detection method until the wireless power transmission to the vehicle 1 is started.

If it is determined that the wireless power transmission to the vehicle 1 is started (YES in step S14), the power supply ECU 250 performs the coil foreign object detection according to the relative detection method instead of the absolute detection method (step S16). The contents of the coil foreign object detection according to the relative detection method will be described later in detail with reference to FIG. 10.

Next, the power supply ECU 250 determines whether or not the wireless power transmission to the vehicle 1 is completed (step S18). If it is determined that the wireless power transmission to the vehicle 1 is not completed (NO in step S18), the power supply ECU 250 returns the procedure to step S16, and continues to perform the coil foreign object detection according to the relative detection method until the wireless power transmission to the vehicle 1 is completed.

If it is determined that the wireless power transmission to the vehicle 1 is completed (YES in step S18), the power supply ECU 250 stops the coil foreign object detection (step S20).

Figure 9:
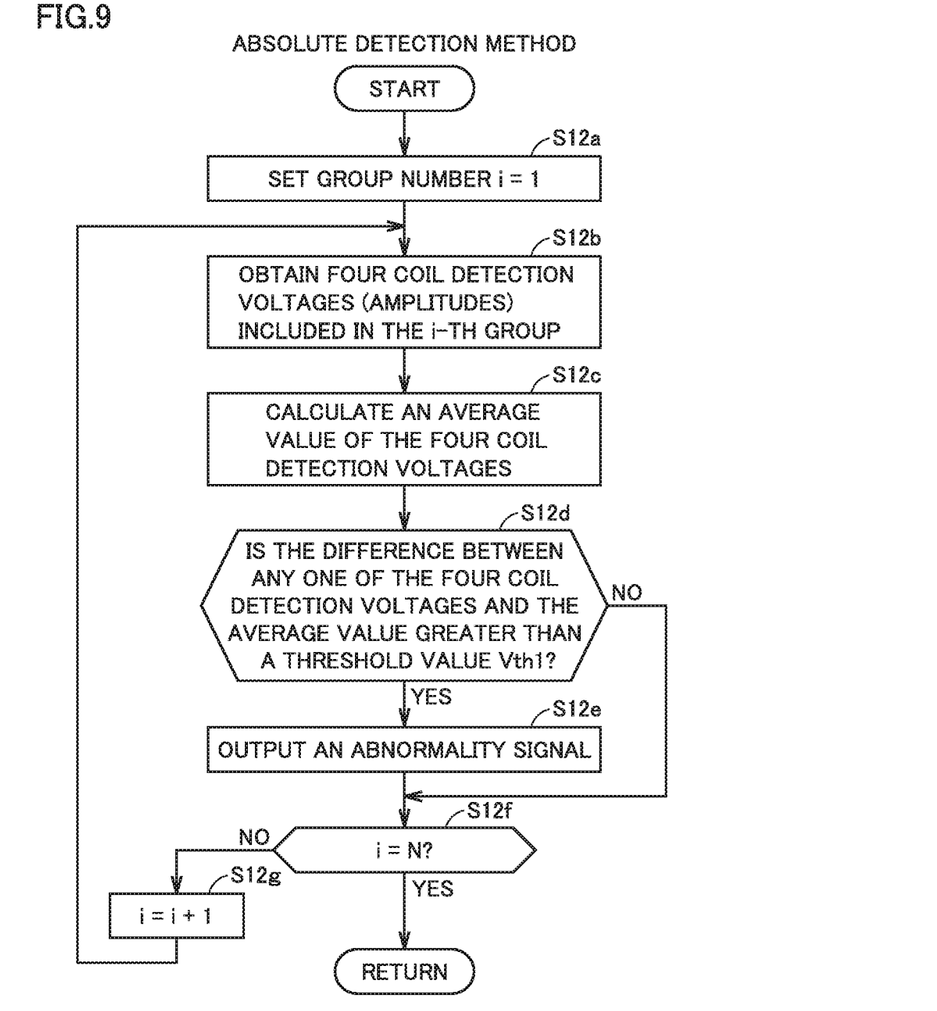
FIG. 9 is a flowchart illustrating the details of a coil foreign object detection process according to an absolute detection method.

FIG. 9 is a flowchart illustrating the details of the coil foreign object detection process (step S12 of FIG. 8) according to the absolute detection method. Hereinafter, the amplitude of the detection voltage of the reception coil C2 may be simply referred to as "coil detection voltage".

First, the power supply ECU 250 sets the number i of the i-th group of the foreign object detection coils to the initial value "1" (step S12a). As described in the above, the i-th group refers to such a group of foreign object detection coils that each has a wiring length equal to the wiring length of the i-th (i=1 to 12) foreign object detection coil of the foreign object detection coils A01 to A12.

The power supply ECU 250 obtains four coil detection voltages included in the i-th group (step S12b).

The power supply ECU 250 calculates an average value of the four coil detection voltages obtained in step S12b (step S12c).

The power supply ECU 250 determines whether or not the difference between any one of the four coil detection voltages obtained in step S12b and the average value calculated in step S12c is greater than a threshold value Vth1 (step S12d).

If it is determined that the difference between any one of the four coil detection voltages and the average value is not greater than the threshold value Vth1 (NO in step S12d), the power supply ECU 250 skips the procedure of step S12e and proceeds the procedure to step S12f.

If it is determined that the difference between one of the four coil detection voltages and the average value is greater than the threshold value Vth1 (YES in step S12d), the power supply ECU 250 determines that a foreign object is present above the reception coil C2 that has output the coil detection voltage whose difference between the average value is greater than the threshold value Vth1, and outputs to the vehicle 1 an abnormality signal indicating that a foreign object is present (step S12e).

Next, the power supply ECU 250 determines whether or not the current group number i is equal to the maximum group number N ("12" in the present embodiment) (step S12f).

If it is determined that the current group number i is not equal to the maximum group number N (NO in step S12f), the power supply ECU 250 increments the current group number i by 1 (step S12g). Thereafter, the power supply ECU 250 returns the procedure to step S12b, and repeats the subsequent procedure after step S12b until the group number i is equal to the maximum group number N.

If it is determined that the group number i is equal to the maximum group number N (YES in step S12f), the power supply ECU 250 ends the procedure. Thereafter, the procedure is proceeded to step S14 of FIG. 8.

Figure 10:
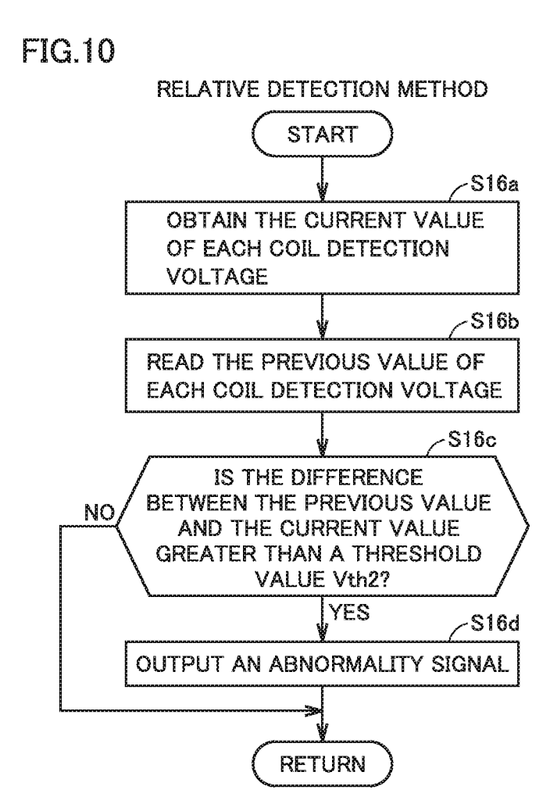
FIG. 10 is a flowchart illustrating the details of a coil foreign object detection process according to a relative detection method.

FIG. 10 is a flowchart illustrating the details of the coil foreign object detection process (step S16 in FIG. 8) according to the relative detection method.

The power supply ECU 250 obtains the current value of a coil detection voltage (step S16a). The current value of a coil detection voltage obtained in step S16a is stored in a memory of the power supply ECU 250, and is used as the previous value of the coil detection voltage in the next calculation.

Next, the power supply ECU 250 reads the previous value of the coil detection voltage from the memory (step S16b).

The power supply ECU 250 determines whether or not the difference between the previous value and the current value of the coil detection voltage is greater than a threshold value Vth2 (step S16c).

If it is determined that the difference between the previous value and the current value of the coil detection voltage is greater than the threshold value Vth2 (YES in step S16c), the power supply ECU 250 determines that a foreign object is present above the reception coil C2 which has the difference between the previous value and the current value greater than the threshold value Vth2, and outputs to the vehicle 1 an abnormality signal indicating that a foreign object is present (step S16d).

If it is determined that the difference between the previous value and the current value of the coil detection voltage is not greater than the threshold value Vth2 (NO in step S16c), the power supply ECU 250 ends the procedure. Thereafter, the procedure is proceeded to step S18 of FIG. 8.

<Process Flow of Camera Foreign Object Detection>

Figure 11:
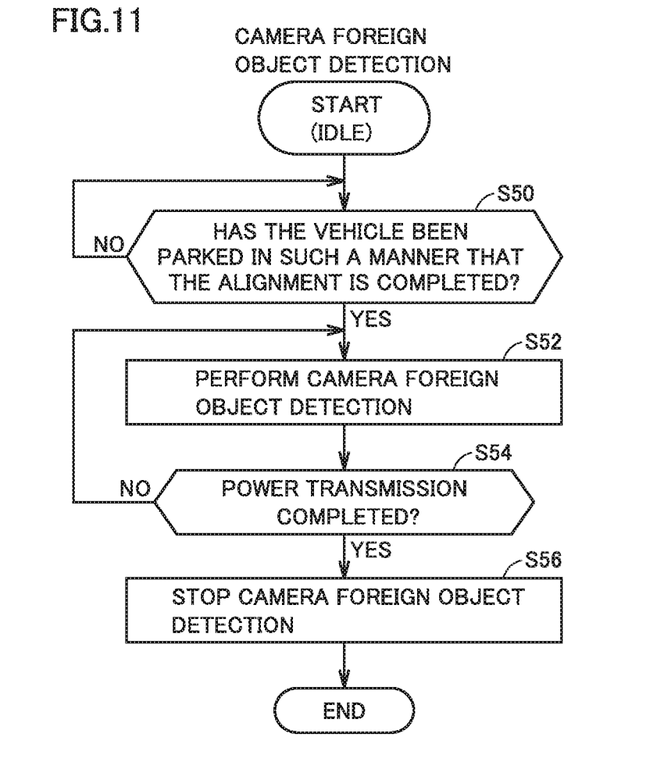
FIG. 11 is a flowchart schematically illustrating an example of a process to be performed by a power supply ECU when performing the camera foreign object detection.

FIG. 11 is a flowchart schematically illustrating an example of a process to be performed by the power supply ECU 250 when performing the camera foreign object detection. This flowchart is started when the power transmission device 10 is in the idle state (standby state). As described in the above, the camera foreign object detection is stopped in the idle state.

The power supply ECU 250 determines whether or not the vehicle 1 has been parked in such a manner that the alignment between the vehicle 1 and the power transmission device 10 is completed (step S50).

If it is determined that the vehicle 1 has not been parked in such a manner that the alignment is completed (NO in step S50), the power supply ECU 250 returns the procedure to step S50, and waits until the alignment of the parked vehicle 1 is completed.

If it is determined that the vehicle 1 has been parked in such a manner that the alignment is completed (YES in step S50), the power supply ECU 250 performs the camera foreign object detection (step S52). The camera foreign object detection is continued even after the wireless power transmission to the vehicle 1 is initiated.

Next, the power supply ECU 250 determines whether or not the wireless power transmission to the vehicle 1 is completed (step S54). If it is determined that the wireless power transmission to the vehicle 1 is not completed (NO in step S54), the power supply ECU 250 returns the procedure to step S52, and continues the camera foreign object detection until the wireless power transmission to the vehicle 1 is completed.

If it is determined that the wireless power transmission to the vehicle 1 is completed (YES in step S54), the power supply ECU 250 stops the camera foreign object detection (step S56).

As described in the above, the power supply ECU 250 according to the present embodiment performs the foreign object detection (first foreign object detection) according to the absolute detection method, i.e., the power supply ECU 250 groups the foreign object detection coils having the same wiring length, and determines that a foreign object is present when there is a difference between the outputs of the foreign object detection coils in the same group. According to the absolute detection method, it is possible to accurately determine the presence or absence of a foreign object without comparing the output of the foreign object detection coil with the previous value thereof. As a result, it is possible to accurately determine the presence or absence of a foreign object even when the foreign object is present at the startup of the power transmission device 10.

In particular, in the coil foreign object detection (first foreign object detection) according to the absolute detection method, the average value of the outputs of a plurality of foreign object detection coils having the same wiring length is compared with the output of each foreign object detection coil, and it is determined that a foreign object is present above a foreign object detection coil when the difference between the average value and the output of the foreign object detection coil is greater than a predefined value. Thereby, it is possible to determine that a foreign object is present above one of the plurality of foreign object detection coils having the same wiring length.

Furthermore, the power supply ECU 250 according to the present embodiment not only performs the coil foreign object detection (first foreign object detection) according to the absolute detection method before the start of the wireless power transmission from the power transmission coil 242 but also performs the coil foreign object detection (second foreign object detection) according to the relative detection method instead of the absolute detection method during the wireless power transmission. Thereby, it is possible to accurately determine the presence or absence of a foreign object before the start of the wireless power transmission and during the wireless power transmission.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A wireless power transmission device comprising:
   a power transmission coil configured to transmit power in a wireless manner to a power reception coil of a power reception device;
   a plurality of foreign object detection coils disposed along an upper surface of the power transmission coil; and
   a controller connected to the plurality of foreign object detection coils and configured to detect whether or not a foreign object is present above the power transmission coil by using outputs of a group of the plurality of foreign object detection coils,
   the controller being configured to perform a first foreign object detection to determine that the foreign object is present above the power transmission coil when there is a difference between outputs of the group of the plurality of foreign object detection coils each having the same wiring length to the controller among the plurality of foreign object detection coils, wherein the first foreign object detection includes:
   comparing an average value of outputs of the group of the plurality of foreign object detection coils each having the same wiring length with an output of each foreign object detection coil, and
   determining that the foreign object is present above a foreign object detection coil when the difference between the average value and the output of the foreign object detection coil is greater than a predefined value.

2. The wireless power transmission device according to claim 1, wherein
   the controller is configured to
   perform the first foreign object detection before a start of the power transmission from the power transmission coil to the power reception coil, and
   perform a second foreign object detection, instead of the first foreign object detection, to determine that the foreign object is present above at least one foreign object detection coil of the plurality of foreign object detection coils when an output of the at least one foreign object detection coil changes during the power transmission from the power transmission coil to the power reception coil.

3. The wireless power transmission device according to claim 1, wherein
   the wireless power transmission device further includes a camera disposed on the upper surface of the power transmission coil,
   the controller is configured to detect, by using the camera, the foreign object that is present in a range away from the upper surface of the power transmission coil with a predefined distance or more in an upward direction.

* * * * *